Patented Feb. 29, 1944

2,343,093

UNITED STATES PATENT OFFICE 2,343,093

TREATMENT OF TEXTILES AND COMPOSITION USEFUL THEREFOR

Joseph Edward Smith, Wilmington, Del., assignor to E. I. du Pont de Nemours & Company, Wilmington, Del., a corporation of Delaware No Drawing. Application August 3, 1940, Serial No. 351,087

19 Claims. (Cl. 260—27)

This invention relates to dispersions of mixed resins prepared by dissolving resinous materials in monomeric liquids capable of polymerization and polymerizing, and more particularly to aqueous dispersions of resins prepared by dissolving resinous materials in monomeric vinyl compounds and polymerizing, and still more particularly to dispersions of the above resins substantive to animal fibers, nylon and cellulosic fibers.

This invention has as an object the preparation of stable dispersions of mixed polymers of monomeric vinyl compounds with resins soluble in the monomer, which are substantive to animal fibers, nylon, and cellulosic fibers. Other objects will appear hereinafter.

These objects are accomplished by the following procedure. A partially or fully polymerized resin polymer selected from either natural or synthetic resins is dissolved, together with a small amount of benzoyl peroxide, in a liquid polymerizable conjugated compound. The solution of the resin is agitated vigorously with an aqueous solution containing a cationic surface active agent and a partially saponified polyvinyl acetate. During agitation a salt of a polyvalent metal or of a heavy metal, preferably aluminum acetate, aluminum formate, or barium chloride, and an acid, preferably acetic acid or formic acid, are added. The emulsion is heated to produce polymerization of the ester monomer. The resulting resin dispersion is stable. The dispersion is substantive to animal fibers, nylon, and cellulosic fibers.

As an alternative method of preparation the polyvalent or heavy metal salt and the acid may be added to the dispersion after the polymerization step to obtain similar substantivity and stability of the dispersion.

The preparation of aqueous dispersions of mixed polymers of methacrylic acid esters and vinyl alcohol esters with natural and synthetic resins soluble in the ester monomer, and the advantages to be derived from them are described in my copending application, Serial No. 351,085 filed on this same day. The preparation of dispersions of mixed polymers of resins with methacrylic acid esters and vinyl alcohol esters, substantive to animal fibers and to nylon is described in my copending application, Serial No. 351,086, filed on this same day. It frequently is essential to apply dispersions of mixed resin polymers by a process of exhaustion from a long bath onto fibers of natural cellulose, regenerated cellulose, cellulose esters and cellulose ethers as well as animal fibers and nylon. The application by exhaustion from a bath is particularly adapted to knitted goods that cannot be conveniently handled in a quetsch and is useful in plants that do not have the equipment for a quetsch application.

In carrying out the invention, an aqueous solution of a cationic surface active agent and a partially saponified polyvinyl acetate is agitated vigorously with a monomeric methacrylic acid ester or a monomeric vinyl alcohol ester containing in solution a substantial proportion of a soluble resin and a small amount of benzoyl peroxide. An aqueous solution of a polyvalent metal salt or a heavy metal salt, as aluminum acetate, aluminum formate, or barium chloride, and an acid, as acetic acid or formic acid, is added while continuing the agitation. A stable emulsion is obtained. The emulsion is heated, preferably to a temperature above 60° C., to induce polymerization of the emulsified monomer. A stable resin dispersion is obtained.

It has been found that cationic surface active agents and glue act as retardants in the application of dispersions of this type to animal fibers and nylon; a sufficient concentration of the cationic surface active agent or glue in the bath may inhibit exhaustion of the dispersion almost completely. The surface active agent may also function as a carrier to produce adsorption of the dispersion onto the fibers. It is essential that if a cationic surface active agent is to be used in this colloidal system the surface active agent be associated intimately in the resin particle and that very little be present in free solution. A large excess of surface active agent over that required to obtain substantivity should be avoided.

The resin dissolved in the vinyl monomer may be an ester gum (a glyceryl ester of abietic acid), a pinenephenol condensation product, a phenol-formaldehyde resin, an alkyd or a rosin modified alkyd resin, a cumarone-indene resin, or a polyvinyl acetate resin. The cationic surface active agents may be a quaternary ammonium derivative, a higher alkyl pyridinium derivative, an alkyl betaine, or a higher alkyl sulfonium or phosphonium derivative.

It frequently is desirable to use plasticizers in the methacrylate resin compositions to obtain the desired sizing effect. These plasticizers may be included in the resin compositions described herein without affecting the affinity of the resin particles for cellulosic fibers, animal fibers, and nylon.

The variation in affinity of the resin dispersions for cellulosic fibers, and modified cellulosic fibers, animal fibers and nylon is as described in my copending application, Serial No. 351,084, filed on this same day. The effect of variation in the pH and temperature in the application bath as well as the effect of the presence of cationic surface active agents and glue in the bath on the substantivity of the dispersed resin is as described in the copending application identified in this paragraph, to which reference may be made for further disclosure.

The following examples are illustrative of the invention but are not intended as limiting it in any way. Parts are given by weight except where it may be otherwise indicated.

EXAMPLE 1

Twelve parts of the glyceryl ester of abietic acid and 0.12 part of benzoyl peroxide were dissolved in 12 parts of methyl methacrylate monomer. The resin solution was emulsified in water by mixing with 2.4 parts of a partially saponified polyvinyl acetate, 0.02 part of technical dodecyl diethylcyclohexylamine sulfate and 0.7 part of stearyl trimethyl ammonium bromide dissolved in 72.76 parts of water; agitation was obtained with a high-speed mixer. The saponification number of the partially saponified polyvinyl acetate was 109 and the viscosity of a 4% aqueous solution at 20° C. was 20 centipoises. After stirring for 3 minutes the emulsion was placed in a flask and aged for 4 hours at 67° C. A stable dispersion of a resinous polymer was obtained.

EXAMPLE 2

Twelve parts of the glyceryl ester of abietic acid and 0.12 part of benzoyl peroxide were dissolved in 12 parts of methyl methacrylate monomer. The resin solution was emulsified in water by mixing with 2.4 parts of a partially saponified polyvinyl acetate, 0.02 part of technical dodecyl diethylcyclohexylamine sulfate and 0.7 part of stearyl trimethyl ammonium bromide dissolved in 69.36 parts of water; agitation was obtained with a high-speed mixer. The saponification number of the partially saponified polyvinyl acetate was 109 and the viscosity of a 4% aqueous solution at 20° C. was 20 centipoises. Three parts of a 32% basic aluminum acetate solution and 0.4 part of acetic acid were added while continuing the agitation. After agitating for a total of 3 minutes a stable emulsion was obtained. The emulsion was heated for 4 hours at 67° C. to obtain a stable dispersion of a resinous polymer.

EXAMPLE 3

One half gram of the product from Example 1 was dispersed in 200 cc. of soft water and the pH of the bath adjusted to 4.5. The bath was placed in a pint Mason jar and a 10-gram strip of viscose process rayon crepe was entered in the jar. The bath was agitated for 15 minutes at 95° F. in a Launder-Ometer. About 60% of the resin dispersion was absorbed by the goods from the bath. The goods were hydro-extracted and dried on a mangle. A full hand with appreciable stiffness was obtained on the goods, and the fabric was well delustered. The threads of the goods were much more resistant to slipping than those of the untreated goods.

EXAMPLE 4

Cellulose acetate piece-goods were treated as in Example 3. At least 60% of the dispersion exhausted from the bath onto the goods. Considerable body and stiffness were obtained on the goods. The threads of the goods were much more resistant to slipping.

EXAMPLE 5

One gram of the product from Example 1 was dispersed in 200 cc. of soft water and the pH of the bath adjusted to 5.6. A full-fashioned silk stocking weighing 15 grams was entered in the bath in a pint Mason jar. The bath was agitated for 10 minutes at 80° F. and for 5 minutes at 100° F. At least 75% of the dispersion exhausted from the bath onto the stocking. The stocking was hydro-extracted, boarded and dried at about 200° F. The treatment added considerable fullness to the stocking and markedly improved the snag resistance.

EXAMPLE 6

One gram of the product from Example 1 was dispersed in 200 cc of soft water and the pH of the bath adjusted to 6.5. The bath, together with a 10-gram nylon stocking, was added to a pint Mason jar. The jar was agitated for 5 minutes at 100° F. and 25 minutes at 120° F. At least 60% of the dispersed resin was absorbed from the bath by the stocking. The stocking was hydro-extracted, boarded and dried at about 200° F. The resin treatment added considerable body to the stocking and markedly improved the snag resistance.

EXAMPLE 7

One-half gram of the product from Example 1 was dispersed in 200 cc. of soft water and the pH of the bath adjusted to 6.0. The bath was contained in a pint Mason jar. A ten-gram piece of wool serge was entered in the bath and the bath agitated for 20 minutes at 120° F. Practically all of the resin dispersion was absorbed from the bath by the goods. The goods were extracted and dried on a mangle. Considerable body and stiffness were added to the goods by the treatment.

EXAMPLE 8

The product of Example 2 was applied to viscose process rayon as in Example 3. About 80% of the dispersion was absorbed by the goods. The finish obtained was similar to that of Example 3.

EXAMPLE 9

The product of Example 2 was applied to cellulose acetate piece goods as in Example 4. About 80% of the dispersion was absorbed by the goods. The finish obtained was similar to that of Example 4.

EXAMPLE 10

The product of Example 2 was applied to a silk stocking as in Example 5. The dispersion of resin exhausted almost completely from the bath onto the stocking. The finish obtained was similar to that in Example 5.

EXAMPLE 11

The product of Example 2 was applied to a nylon stocking as in Example 6. About 80% of the resin dispersion was absorbed from the bath by the stocking. The finish obtained was similar to that in Example 6.

EXAMPLE 12

The product from Example 2 was applied by the method of Example 7 to wool serge. About 80% of the dispersion was exhausted from the bath by the goods. The finish obtained was similar to that in Example 7.

Example 13

An equal weight of n-butyl methacrylate monomer was substituted for the methyl methacrylate monomer in Example 1. A stable dispersion was obtained.

The resin dispersion was applied to viscose process rayon, cellulose acetate, silk, nylon and wool, as in Examples 3, 4, 5, 6, and 7. Marked delustering, improved resistance to slipping and snagging and appreciably increased body were obtained on the textile fabrics and knit goods.

Example 14

Eight parts of the glyceryl ester of abietic acid, 0.25 part of benzoyl peroxide and 4.8 parts of di-(methylcyclohexyl) adipate were dissolved in 11.2 parts of methyl methacrylate monomer. The resin solution was emulsified and polymerized as in Example 1 to obtain a stable resin polymer.

The resin dispersion was applied to viscose process rayon, cellulose acetate, silk, nylon and wool, as in Examples 3, 4, 5, 6 and 7. Considerable delustering, improved resistance to slipping and snagging and appreciably increased body were obtained on the textile fabrics and knit goods.

Example 15

Di-(butoxy ethyl) phthalate was substituted for di-(methylcyclohexyl) adipate in Example 14 to obtain similar results.

Example 16

Butyl phthalyl butyl glycolate was substituted for di-(methylcyclohexyl) adipate in Example 14 to obtain similar results.

Example 17

The stearyl trimethyl ammonium bromide in Example 2 was replaced by an equal weight of the product described in Example 1 of U. S. Patent 2,129,264 to obtain a stable dispersion. The dispersion was applied to viscose process rayon, cellulose acetate, silk, nylon, and wool as in Examples 3, 4, 5, 6, and 7. Similar results were obtained.

Example 18

The stearyl trimethyl ammonium bromide in Example 2 was replaced by an equal weight of the condensation product of diethanolamine and stearic acid after treated with dimethyl sulfate (see U. S. Patent 2,096,749) to obtain a stable dispersion. The dispersion was applied as in Examples 3, 4, 5, 6, and 7 to obtain similar results.

Example 19

The stearyl trimethyl ammonium bromide in Example 2 was replaced by an equal weight of cetyl pyridinium bromide to obtain a stable dispersion. The dispersion was applied as in Examples 3, 4, 5, 6, and 7 to obtain similar results.

Example 20

The glyceryl ester of abietic acid of Example 2 was replaced by an equal weight of a pinene-phenol condensation product. A stable dispersion was obtained. The dispersion was applied to viscose process rayon, cellulose acetate, silk, nylon and wool as in Examples 3, 4, 5, 6, and 7. Similar results were obtained.

Example 21

The glyceryl ester of abietic acid of Example 1 was replaced by an equal weight of a tertiary butyl phenol-formaldehyde resin. A stable dispersion was obtained. The dispersion was applied as in Examples 3, 4, 5, 6, and 7. Excellent body and stiffness, increased resistance to snagging and slipping were obtained on the fabrics and knit goods.

Example 22

The glyceryl ester of abietic acid of Example 1 was replaced by an equal weight of a rosin modified alkyd resin. A stable dispersion was obtained. The dispersion was applied as in Examples 3, 4, 5, 6, and 7. Good body and stiffness and appreciably increased resistance to snagging and slipping were obtained on the treated fabrics and knit goods.

Example 23

The glyceryl ester of abietic acid of Example 2 was replaced by an equal weight of a cumarone-indene polymer. A stable dispersion was obtained. The dispersion was applied as in Examples 3, 4, 5, 6 and 7. Increased body and appreciably increased resistance to snagging and slipping were obtained on the treated fabrics and knit goods.

Example 24

Six parts of the hydrogenated glyceryl ester of abietic acid and 0.12 part of benzoyl peroxide were dissolved in 12 parts of vinyl acetate monomer. The resin solution was emulsified in water by mixing with 2.4 parts of a partially saponified polyvinyl acetate, 0.02 part of technical dodecyl diethylcyclohexylamine sulfate and 0.7 part of stearyl trimethyl ammonium bromide dissolved in 75.36 parts of water; agitation was obtained with a high-speed mixer. The saponification number of the partially saponified polyvinyl acetate was 180 and the viscosity of a 4% aqueous solution at 20° C. was 20 centipoises. Three parts of a 32% basic aluminum acetate solution and 0.4 part of acetic acid were added while continuing the agitation. After agitating for a total of 3 minutes a stable emulsion was obtained. The emulsion was heated for 16 hours at 67° C. A stable dispersion of a resinous polymer was obtained.

Example 25

The product of Example 24 was applied to viscose process rayon, cellulose acetate rayon, nylon, silk and wool as in Examples 3, 4, 5, 6, and 7. Full, leathery finishes were obtained. Improved resistance to slip was obtained on the viscose process rayon; the silk and nylon stockings were highly snag-resistant.

Example 26

(a) Two and one half parts of bleached sulfite pulp and 88 parts of soft water were placed in a beater and the pH of the bath was adjusted to 5.5. The mix was agitated at 70° F. 0.025 part of the composition of Example 15 dispersed in 9.425 parts of water was added and the agitation continued 20 minutes at the same temperature. At the end of the run the pulp was filtered and the amount of dispersion remaining in the water was determined by a turbidity method. The bath was found to be 90 to 95% exhausted of dispersion, and the wet strength of the paper prepared from the pulp was markedly increased.

(b) The run was repeated at a pH of 7.0.

The results were substantially the same as those of Example 26(a).

(c) The run was repeated at a pH of 8.0. The results were substantially the same as those of Example 26(a).

EXAMPLE 27

0.5 part of the product from Example 2 and 0.5 part of Composition A (see below) were dispersed in 99 parts of water and applied to a 15 gram silk stocking by the method of Example 5. The stocking had a full hand, excellent water repellency and the snag resistance was markedly improved.

Composition A

| | Per cent |
|---|---|
| Refined paraffin wax | 16.7 |
| Acetate of deacetylated chitin | 1.3 |
| Basic aluminum acetate | 3.0 |
| Acetic acid | 0.5 |
| Technical dodecycl diethylcyclohexylamine sulfate | 0.09 |
| Water | 78.41 |

EXAMPLE 28

One hundred pounds of dyed nylon hose were placed in a 100 lb. Smith-Drum rotary-type dyeing machine. Fifteen pounds of the product from Example 15 were diluted with water and added to the loaded machine. The bath was agitated 5 minutes at 80° F., the temperature was raised to 120° F., and the agitation was continued for a total of 30 minutes. The dispersed phase was 90% exhausted from the bath. The hose were hydro-extracted and boarded on hosiery forms at 180° F. The stockings had an attractive silk-like hand and excellent snag resistance. The finish was resistant to laundering at 110° F.

EXAMPLE 29

Three parts of aluminum formate and 0.4 part of formic acid were substituted for basic aluminum acetate and acetic acid in the composition of Example 2. A stable resin dispersion was obtained. The resin applied to viscose process rayon, cellulose acetate rayon, silk, nylon and wool, by the methods of Examples 3, 4, 5, 6, and 7 gave similar results on the goods.

EXAMPLE 30

Three parts of barium chloride crystals were substituted for basic aluminum acetate in Example 2. A stable resin dispersion was obtained which gave results similar to those of Example 2 on viscose process rayon, cellulose acetate rayon, silk, nylon and wool.

EXAMPLE 31

One hundred pounds of dyed silk hosiery were placed in a 100 lb. Smith-Drum rotary type dyeing machine filled with water. Ten pounds of the product from Example 2 and 5 pounds of Composition A (see Example 27) were diluted with water and added to the loaded machine. The bath was agitated for 10 minutes at 75° F. and then for 5 minutes at 100° F., and at least 80% of the dispersed phase was absorbed by the stockings during this treatment. The pH of the bath was 6.2 at the end of the operation. The hose were hydro-extracted, then boarded and dried on steam-heated hosiery forms at 210° F. The stockings were snag resistant, delustered, highly water repellent and had a full hand. The finish was resistant to laundering at 110° F.

Other vinylidene compounds may be used to replace the methacrylate derivatives and the vinyl acetate used in this invention. For example, butadiene and its derivatives, styrene, vinyl esters, acrylates, acrylamides, methacrylamides, acrylonitriles, and methacrylonitriles may be used alone or as mixed solvents for the resins. The resins to be dissolved in the monomers may include rosin and its derivatives, dammar gums, alkyd and modified alkyd resins, phenol-formaldehyde and modified phenol-formaldehyde resins, and cumarone-indene resins.

Other plasticizers than di(methylcyclohexyl) adipate, di(butoxy ethyl) phthalate, and butyl phthalyl butyl glycolate may be used. Other suitable plasticizers are disclosed by Strain, Kennelly, and Dittmar in Industrial and Engineering Chemistry, 31, 382 (1939).

Other substantially non-polar high molecular weight water-soluble protective colloids may be used in place of partially saponified polyvinyl acetate. In place of partially saponified polyvinyl acetate there may be used cellulose derivatives such as water-soluble methyl cellulose, the ethylene oxide reaction product of oleyl alcohol, etc.

The technical dodecyl diethyl cyclohexylamine sulfate can be omitted or replaced by other surface active agents as, for example, water soluble salts of alkyl naphthalene sulfonic acids, fatty alcohol sulfates and alkyl sulfonic acids.

The cationic surface active agents may include not only stearyl trimethyl ammonium bromide, technical dodecyl trimethyl-ammonium bromide, cetyl pyridinium bromide, and the condensation product of diethanolamine and stearic acid condensed with dimethyl sulfate, but also long chain alkyl ammonium, sulfonium, and phosphonium halides, and long chain pyridinium halides. The length of the alkyl chain on the surface active agents is preferably 12 to 18 carbon atoms.

The reaction product of trimethyl amine and alpha-brom stearic acid (see U. S. Patent 2,129,264, Example 1), is not a cationic surface active agent in alkaline solution but does have a high affinity for cellulosic materials in the pH range 3 to 5. It acts to provide substantivity to the resin dispersions in this pH range, particularly in the presence of multivalent and heavy metal water soluble salts. Similar compounds containing other alkyl groups with chain length 12 to 18 carbon atoms can be used.

The positive charge on the dispersed particles may be obtained by the addition of water soluble heavy metal or multivalent salts instead of aluminum acetate to the emulsions. For example, salts of Ba, Cd, Co, Fe, Ni, Mn, Zn, Sn, Pb, Sb, Bi, and Cr can be used. Formic, propionic, hydrochloric, sulfuric and other acids may be used to replace acetic acid in the emulsions. It is preferable to add the heavy metal salts during the process of emulsification; however, satisfactory substantive emulsions can be obtained by adding the heavy metal salts or salts of multivalent metals to the aged dispersions.

Compositions described herein are useful as sizes for general use in the textile field and on paper. The compositions produce slip-resistant finishes on textiles and increase the wet strength of paper. They may be used to produce durable wash-resistant, starch-like finishes on textiles. The finishes may be used in sizing textiles alone or as binders for fillers as starch, dextrin, gum, talc, clay, etc. The finishes are valuable for producing snag-resistant and slip-resistant effects on nylon and silk piece goods, knitted goods and hosiery.

The primary advantage of the invention is the economical and uniform treatment of textile materials of all types including silk, wool, nylon, natural cellulose, regenerated cellulose and cellulose esters and ethers with a broad variety of resin finishes. The compositions are particularly adapted to treatment of knitted fabrics which cannot be handled satisfactorily on the quetsch. They can be applied to fabrics containing mixed fibers and particularly to fabrics containing mixtures of wool and rayon staple in plants such as woolen mills which ordinarily are not equipped to handle goods in a quetsch.

The sizing compositions described produce valuable sizing and delustering effects on textiles, improve the resistance of the fabric to slippage and improve resistance of hosiery to snagging. The resins incorporated in wood pulp improve the wet strength of the paper prepared.

The above description and examples are intended to be illustrative only and not to limit the scope of the invention. Any departure therefrom which conforms to the spirit of the invention is intended to be included within the scope of the appended claims.

I claim:

1. A substantive textile finishing composition adapted for application to textile fibers by a process of exhaustion from a dilute aqueous bath comprising a stable aqueous dispersion of a polymerized vinylidene compound containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized vinylidene compound and resin substantive to textile fibers a cationic surface active agent.

2. A substantive textile finishing composition adapted for application to textile fibers by a process of exhaustion from a dilute aqueous bath comprising a stable aqueous dispersion of a polymerized vinyl acetate containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized vinyl acetate and resin substantive to textile fibers a cationic surface active agent.

3. A substantive textile finishing composition adapted for application to textile fibers by a process of exhaustion from a dilute aqueous bath comprising a stable aqueous dispersion of a polymerized alkyl methacrylate containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as an agent which renders the dispersed polymerized alkyl methacrylate and resin substantive to textile fibers a cationic surface active agent.

4. A substantive textile finishing composition adapted for application to textile fibers by a process of exhaustion from a dilute aqueous bath comprising a stable aqueous dispersion of a polymerized vinylidene compound containing intimately incorporated in said polymer a resin which does not contain the vinylidene group, said composition containing as the dispersing agent a water soluble partially saponified polyvinyl acetate, and containing as an agent which renders the dispersed polymerized vinylidene compound and resin substantive to textile fibers a cationic surface active agent.

5. A substantive textile finishing composition adapted for application to textile fibers by a process of exhaustion from a dilute aqueous bath comprising a stable aqueous dispersion of a polymerized vinyl acetate containing intimately incorporated in said polymer a resin which does not contain the vinylidene group, said composition containing as the dispersing agent a water soluble partially saponified polyvinyl acetate, and containing as an agent which renders the dispersed polymerized vinyl acetate and resin substantive to textile fibers a cationic surface active agent.

6. A substantive textile finishing composition adapted for application to textile fibers by a process of exhaustion from a dilute aqueous bath comprising a stable aqueous dispersion of a polymerized alkyl methacrylate containing intimately incorporated in said polymer a resin which does not contain the vinylidene group, said composition containing as the dispersing agent a water soluble partially saponified polyvinyl acetate, and containing as an agent which renders the dispersed polymerized alkyl methacrylate and resin substantive to textile fibers a cationic surface active agent.

7. A substantive textile finishing composition adapted for application to textile fibers by a process of exhaustion from a dilute aqueous bath comprising a stable aqueous dispersion of a polymerized vinylidene compound containing intimately incorporated in said polymer an ester gum, said composition containing as the dispersing agent a water soluble partially saponified polyvinyl acetate, and containing as an agent which renders the dispersed polymerized vinylidene compound and ester gum substantive to textile fibers a cationic surface active agent.

8. A substantive textile finishing composition adapted for application to textile fibers by a process of exhaustion from a dilute aqueous bath comprising a stable aqueous dispersion of a polymerized vinyl acetate containing intimately incorporated in said polymer an ester gum, said composition containing as the dispersing agent a water soluble partially saponified polyvinyl acetate, and containing as an agent which renders the dispersed polymerized vinyl acetate and ester gum substantive to textile fibers a cationic surface active agent.

9. A substantive textile finishing composition adapted for application to textile fibers by a process of exhaustion from a dilute aqueous bath comprising a stable aqueous dispersion of a polymerized alkyl methacrylate containing intimately incorporated in said polymer an ester gum, said composition containing as the dispersing agent a water soluble partially saponified polyvinyl acetate, and containing as an agent which renders the dispersed polymerized alkyl methacrylate and ester gum substantive to textile fibers a cationic surface active agent.

10. A substantive textile finishing composition adapted for application to textile fibers by a process of exhaustion from a dilute aqueous bath comprising a stable aqueous dispersion of a polymerized methyl methacrylate containing intimately incorporated in said polymer an ester gum, said composition containing as the dispersing agent a water soluble partially saponified polyvinyl acetate, and containing as an agent which renders the dispersed polymerized methyl methacrylate and ester gum substantive to textile fibers a cationic surface active agent.

11. A substantive textile finishing composition adapted for application to textile fibers by a process of exhaustion from a dilute aqueous bath comprising a stable aqueous dispersion of a polymerized vinylidene compound containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as agents which render the dispersed polymerized vinylidene compound and resin substantive to textile fibers a cationic surface active agent and a water soluble salt of a multivalent metal.

12. A substantive textile finishing composition adapted for application to textile fibers by a process of exhaustion from a dilute aqueous bath comprising a stable aqueous dispersion of a polymerized vinylidene compound containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as agents which render the dispersed polymerized vinylidene compound and resin substantive to textile fibers a cationic surface active agent and a water soluble aluminum salt.

13. A substantive textile finishing composition adapted for application to textile fibers by a process of exhaustion from a dilute aqueous bath comprising a stable aqueous dispersion of a polymerized vinylidene compound containing intimately incorporated in said polymer a resin which does not contain the vinylidene group, said composition containing as the dispersing agent a substantially non-polar high molecular weight water soluble protective colloid of the group consisting of partially saponified polyvinyl esters, water soluble methyl celluloses and the water soluble ethylene oxide reaction product of oleyl alcohol, and containing as agents which render the dispersed polymerized vinylidene compound and resin substantive to textile fibers a cationic surface active agent and a water soluble barium salt.

14. A substantive textile finishing composition adapted for application to textile fibers by a process of exhaustion from a dilute aqueous bath comprising a stable aqueous dispersion of a polymerized vinylidene compound containing intimately incorporated in said polymer an ester gum, said composition containing as the dispersing agent a water soluble partially saponified polyvinyl acetate, and containing as agents which render the dispersed polymerized vinylidene compound and ester gum substantive to textile fibers a cationic surface active agent and a water soluble salt of a multivalent metal.

15. A substantive textile finishing composition adapted for application to textile fibers by a process of exhaustion from a dilute aqueous bath comprising a stable aqueous dispersion of a polymerized vinylidene compound containing intimately incorporated in said polymer an ester gum, said composition containing as the dispersing agent a water soluble partially saponified polyvinyl acetate, and containing as agents which render the dispersed polymerized vinylidene compound and ester gum substantive to textile fibers a cationic surface active agent and a water soluble aluminum salt.

16. A substantive textile finishing composition adapted for application to textile fibers by a process of exhaustion from a dilute aqueous bath comprising a stable aqueous dispersion of a polymerized vinyl acetate containing intimately incorporated in said polymer an ester gum, said composition containing as the dispersing agent a water soluble partially saponified polyvinyl acetate, and containing as agents which render the dispersed polymerized vinyl acetate and ester gum substantive to textile fibers a cationic surface active agent and a water soluble salt of a multivalent metal.

17. A substantive textile finishing composition adapted for application to textile fibers by a process of exhaustion from a dilute aqueous bath comprising a stable aqueous dispersion of a polymerized n-butyl methacrylate containing intimately incorporated in said polymer an ester gum, said composition containing as the dispersing agent a water soluble partially saponified polyvinyl acetate and containing as agents which render the dispersed polymerized n-butyl methacrylate and ester gum substantive to textile fibers a cationic surface active agent and a water soluble salt of a multivalent metal.

18. A substantive textile finishing composition adapted for application to textile fibers by a process of exhaustion from a dilute aqueous bath comprising a stable aqueous dispersion of a polymerized methyl methacrylate containing intimately incorporated in said polymer an ester gum, said composition containing as the dispersing agent a water soluble partially saponified polyvinyl acetate and containing as agents which render the dispersed polymerized methyl methacrylate and ester gum substantive to textile fibers a cationic surface active agent and a water soluble salt of a multivalent metal.

19. A substantive textile finishing composition adapted for application to textile fibers by a process of exhaustion from a dilute aqueous bath comprising a stable aqueous dispersion of a polymerized methyl methacrylate containing intimately incorporated in said polymer an ester gum, said composition containing as the dispersing agent a water soluble partially saponified polyvinyl acetate and containing as agents which render the dispersed polymerized methyl methacrylate and ester gum substantive to textile fibers a long-chain quaternary ammonium compound and an aluminum salt of a volatile organic acid.

JOSEPH EDWARD SMITH.